(12) United States Patent
Mayo

(10) Patent No.: US 11,836,064 B2
(45) Date of Patent: Dec. 5, 2023

(54) COMPUTING DEVICE MONITORING

(71) Applicant: 1E Limited, London (GB)

(72) Inventor: Andrew Mayo, Maidenhead (GB)

(73) Assignee: 1E Limited, London (GB)

( * ) Notice: Subject to any disclaimer, the term of this patent is extended or adjusted under 35 U.S.C. 154(b) by 62 days.

(21) Appl. No.: 17/180,372

(22) Filed: Feb. 19, 2021

(65) Prior Publication Data

US 2021/0263825 A1 Aug. 26, 2021

(30) Foreign Application Priority Data

Feb. 21, 2020 (GB) ..................................... 2002493

(51) Int. Cl.
| | | |
|---|---|---|
| *G06F 11/00* | (2006.01) | |
| *G06F 11/34* | (2006.01) | |
| *G06F 11/07* | (2006.01) | |
| *G06F 11/30* | (2006.01) | |
| *G06F 11/32* | (2006.01) | |

(52) U.S. Cl.
CPC ........ *G06F 11/3409* (2013.01); *G06F 11/076* (2013.01); *G06F 11/0706* (2013.01); *G06F 11/0757* (2013.01); *G06F 11/3075* (2013.01); *G06F 11/328* (2013.01);
(Continued)

(58) Field of Classification Search
CPC ............. G06F 11/0703; G06F 11/0745; G06F 11/0751; G06F 11/0754; G06F 11/0757; G06F 11/076; G06F 11/0766; G06F 11/0772; G06F 11/3003; G06F 11/302; G06F 11/3051; G06F 11/3072; G06F 11/3075; G06F 11/328; G06F 11/34; G06F 11/3409; G06F 11/3419; G06F 11/3466; G06F 2201/865; G06F 11/0706
See application file for complete search history.

(56) References Cited

U.S. PATENT DOCUMENTS

| | | | | |
|---|---|---|---|---|
| 8,234,229 B2 * | 7/2012 | Castelli | ................... | H04L 43/00 |
| | | | | 713/300 |
| 8,555,385 B1 * | 10/2013 | Bhatkar | ................ | G06F 21/556 |
| | | | | 726/25 |

(Continued)

FOREIGN PATENT DOCUMENTS

| | | | | |
|---|---|---|---|---|
| EP | 2388695 A1 * | 11/2011 | .......... | G06F 11/3409 |
| EP | 2388695 A1 | 11/2011 | | |
| WO | 2015057617 A1 | 4/2015 | | |

OTHER PUBLICATIONS

Combined Search and Examination Report dated Dec. 7, 2020 for GB Application No. GB2002493.1.

(Continued)

*Primary Examiner* — Anthony J Amoroso
(74) *Attorney, Agent, or Firm* — EIP US LLP

(57) ABSTRACT

A method of monitoring an operating state of a computing device includes running a system agent on the computing device. An introduced process is executed on the computing device, and a captured parameter relating to at least one of the system agent and the introduced process is captured. The captured parameter is compared to at least one pre-determined parameter. Where the captured parameter differs from the pre-determined parameter by more than a pre-determined threshold, a signal indicative of a change in operating state of the computing device is output.

16 Claims, 9 Drawing Sheets

(52) U.S. Cl.
CPC ...... *G06F 11/3419* (2013.01); *G06F 11/3051* (2013.01); *G06F 2201/865* (2013.01)

(56) References Cited

U.S. PATENT DOCUMENTS

| | | |
|---|---|---|
| 9,740,474 B2 * | 8/2017 | Hu .......................... H04L 67/34 |
| 2009/0235267 A1 | 9/2009 | McKinney et al. |
| 2012/0017123 A1 | 1/2012 | Masser et al. |
| 2016/0062810 A1 * | 3/2016 | Von Wendorff ...... G06F 11/079 714/38.1 |

OTHER PUBLICATIONS

Yoon et al: "Memory Heat Map: Anomaly Detection in Real-Time Embedded Systems Using Memory Behavior", 2015 52nd ACM/EDAC/IEEE Design Automation Conference (DAC), Jun. 2015.

"Ruoyu Gao et al" An Exploratory Study on Assessing the Impact of Environment Variations on the Results of Load Tests, 2017 IEEE/ACM 14th International Conference on Mining Software Repositories.

\* cited by examiner

COMPUTING DEVICE MONITORING

CROSS-REFERENCE TO RELATED APPLICATIONS

This application claims priority to GB Application No. GB2002493.1, filed Feb. 21, 2020, under 35 U.S.C. § 119(a). The above-referenced patent application is incorporated by reference in its entirety.

BACKGROUND OF THE INVENTION

Field of the Invention

The present invention relates to methods of monitoring an operating state of a computing device.

Description of the Related Technology

It is desirable to provide a high level of user satisfaction for computing devices. Typically a user experience can deteriorate when the system health of the computing device impacts on how a user perceives their interaction with the device. For example, it may be the case that the system health of the computing device deteriorates to such a level that a user perceives the computing device to be running slowly. This may cause the user to become irritated. So-called "task-managers" may be employed, with such task-managers typically focusing on displaying system resource usage (e.g. processor activity, memory activity, disk activity, network activity, etc.). Known task-mangers typically simply display system resource usage. This may be of relatively little use in determining why a process is using a particular level of system resource. Known task-managers therefore have limitations.

SUMMARY

According to a first aspect of the present disclosure, there is provided a method of monitoring an operating state of a computing device, the method comprising; running a system agent on the computing device; executing an introduced process on the computing device; capturing a captured parameter relating to at least one of the system agent and the introduced process; comparing the captured parameter to at least one pre-determined parameter; and where the captured parameter differs from the pre-determined parameter by more than a pre-determined threshold, outputting a signal indicative of a change in operating state of the computing device.

According to a second aspect of the present disclosure, there is provided a method of operating a system comprising first and second computing devices, the method comprising: running a system agent on the first computing device; executing an introduced process on the first computing device; capturing at least one captured parameter relating to the system agent and/or the introduced process; comparing the captured parameter to at least one pre-determined parameter; and where the captured parameter differs from the pre-determined parameter by more than a pre-determined threshold, outputting a signal indicative of a change in an operating state of the first computing device; and in response to the signal, modifying an operating state of the second computing device and/or modifying an operating state of a system agent running on the second computing device.

According to a third aspect of the present disclosure, there is provided a method of monitoring an operating state of a computing device, the method comprising; running a system agent on the computing device; executing the introduced process on the computing device; capturing a time period of execution of the introduced process; comparing the time period of execution to a pre-determined time period value; and where the time period of execution differs from the pre-determined time period value by more than a pre-determined threshold, outputting a signal indicative of a change in an operating state of the computing device.

According to a fourth aspect of the present disclosure, there is provided a method of monitoring an operating state of a system agent, the method comprising; running a system agent on a computing device; executing the introduced process on the computing device; capturing a captured processing overhead value of the system agent during and/or after the execution of the introduced process; comparing the captured processing overhead value to a pre-determined processing overhead value; and where the captured processing overhead value differs from the pre-determined processing value by more than a pre-determined threshold, outputting a signal indicative of a change in an operating state of the system agent.

Further features will become apparent from the following description, given by way of example only, which is made with reference to the accompanying drawings.

DETAILED DESCRIPTION OF CERTAIN INVENTIVE EMBODIMENTS

Figure 1:
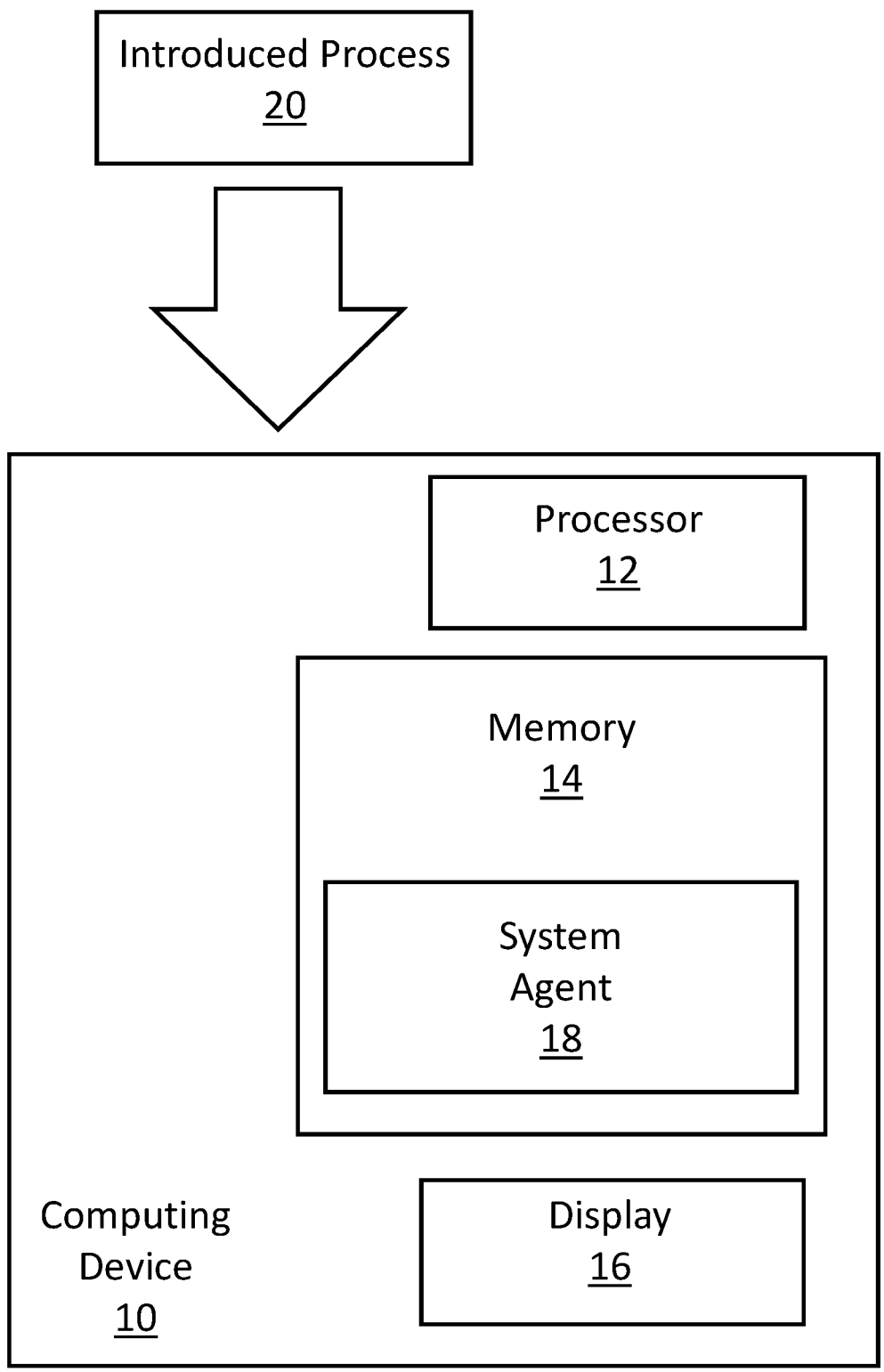
FIG. 1 is a schematic view of a computing device according to an example.

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

In examples herein, methods comprise running a system agent on a computing device, executing an introduced process on the computing device, capturing a captured parameter relating to at least one of the system agent and the introduced process, comparing the captured parameter to at least one pre-determined parameter, and where the captured parameter differs from the pre-determined parameter by more than a pre-determined threshold, outputting a signal indicative of a change in operating state of the computing device. This may enable monitoring a response of the computing device to the introduced process, and may provide a notification to the user or a system engineer where the introduced process negatively affects the system agent or the operating state of the computing device.

In some examples herein, methods comprise capturing a time period of execution of the introduced process, comparing the time period of execution to a pre-determined time period value, and where the time period of execution differs from the pre-determined time period value by more than a pre-determined threshold, outputting a signal indicative of a change in an operating state of the computing device. In this way, the time period of execution of the introduced process many be monitored, and where, for example, the time period of execution differs significantly from a normal or average time period of execution, a user or a system engineer may be notified via the signal. This may provide a notification to a user or system engineer that something has caused a change in the operating state of the computing device.

In some examples herein, methods comprise capturing a captured processing overhead value of the system agent during and/or after the execution of the introduced process, comparing the captured processing overhead value to a pre-determined processing overhead value, and where the captured processing overhead value differs from the pre-determined processing value by more than a pre-determined threshold, outputting a signal indicative of a change in an operating state of the system agent. In this way, the processing overhead of the system agent may be monitored, and where, for example, the processing overhead differs significantly from a normal or average processing overhead for the system agent, a user or system engineer may be notified via the signal. This may provide an indication to a user or system engineer that something has caused a change in the operating state of the system agent and/or the computing device. For example, it may be determined that the introduced process has had an impact on the operating state of the system agent.

In some examples herein, systems may comprise first and second computing devices, and methods of operating systems comprising first and second computing devices may comprise running a system agent on the first computing device, executing an introduced process on the first computing device, capturing at least one captured parameter relating to the system agent and/or the introduced process, comparing the captured parameter to at least one pre-determined parameter, and where the captured parameter differs from the pre-determined parameter by more than a pre-determined threshold, outputting a signal indicative of a change in an operating state of the first computing device, and in response to the signal, modifying an operating state of the second computing device and/or modifying an operating state of a system agent running on the second computing device. This may, for example, enable the second computing device, or a system agent running on the second computing device, to be updated where it has been determined that an introduced process has had a negative impact on a first processing device. This may enable the second computing device, or a system agent running on the second computing device, to be pre-emptively updated based on the response of the first computing device to an introduced process.

To put these examples into context, FIG. 1 schematically shows a computing device 10 in accordance with an example of the present disclosure. The computing device 10 may comprise any computing device, and may, for example, comprise any of a desktop computer, a laptop, a tablet device, or a cell phone. The computing device 10 comprises a processor 12, a memory 14, a display 16, and an installed system agent 18 stored in the memory 14. Whilst shown here with a display 16, it will be recognised that a display may not be necessary within the scope of the present invention. The processor 12 may comprise any suitable processor, with the choice of processor 12 being dependent on the type of the computing device 10, for example. The processor 12 may have many functions, and may be configured to run the system agent 18 on the computing device 10. The system agent 18 may comprise a software application capable of running on the computing device 10, and may, for example, comprise an anti-virus software application. Such an agent may be arranged to execute automatically on system start-up and thereafter operate in the 'background'. An output of the system agent 18 may be displayed on the display 16, and when running the system agent 18 may consume a proportion of the processing power of the processor 12, or a proportion of the memory 14 of the computing device 10.

The processor 12 is configured to execute an introduced process 20 on the computing device 10, to capture a captured parameter relating to at least one of the system agent 18 and the introduced process 20, to compare the captured parameter to a pre-determined threshold, and where the captured parameter differs from the pre-determined parameter by more than a pre-determined threshold, to output a signal indicative of a change in operating state of the computing device 10. It will be appreciated that, in practice, either the processor 12 or the computing device 10 may comprise a comparator for performing the comparison, and that one or more sensors may be used to capture the captured parameter. It will also be appreciated that the signal output may take many forms. For example, the signal may comprise a visual signal displayed on the display 16 or may comprise an electrical signal that may be transmitted to a server to which the computing device 10 is connected.

Figure 2:
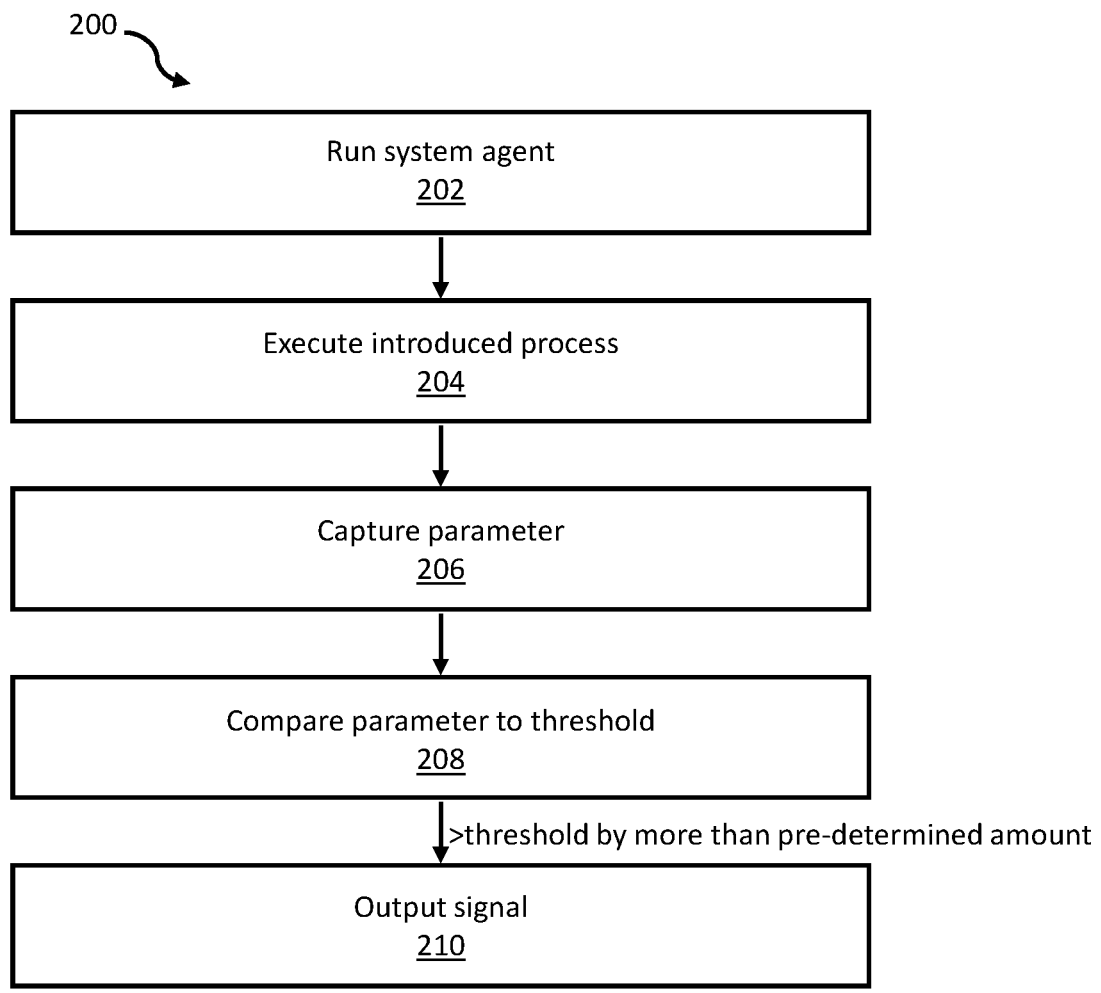
FIG. 2 is a schematic view illustrating a first method of monitoring an operating state of a computing device according to an example.

A method 200 of monitoring an operating state of the computing device 10 is shown schematically in FIG. 2. The method 200 comprises running 202 the system agent 18 on the computing device 10, and executing 204 the introduced process 20 on the computing device 10. A captured parameter is captured 206, with the captured parameter relating to at least one of the system agent 18 and the introduced process 20. The captured parameter is compared 208 to a pre-determined parameter and where the captured parameter differs from the pre-determined parameter by more than a pre-determined threshold, a signal is output 210, with the signal being indicative of a change in operating state of the computing device 10.

The method 200 may enable a computing device 10 response to the introduced process 20 to be monitored, and a notification of a change in operating state of the computing device 10 to be provided. The signal may be indicative that the system agent 18 is negatively impacting on the introduced process 20, and hence that the operating state of the computing device 10 has changed. For example, anti-virus software may consume excessive CPU when other software performs operations such as file I/O, because the anti-virus software is intercepting these operations and examining them. The method 200 may allow for identification of such a case, and for action in response to the identification to be taken. For example, the introduced process 20 may be whitelisted in response to the signal, where the introduced process 20 is a trusted process. This may remove or reduce an interaction between the system agent 18 and the introduced process 20 during execution of the introduced process 20.

In an example, the signal indicative of a change in the operating state of the computing device 10 may be output where the captured parameter is greater than the pre-determined parameter by more than the pre-determined threshold.

In some examples, the captured parameter may comprise a processing overhead value of the system agent 18 during and/or after the execution of the introduced process 20, and the pre-determined parameter may comprise a nominal processing overhead of the system agent 18 for a given operating state of the computing device 10. For example, the pre-determined parameter may comprise a nominal value for the processing overhead of the system agent for the known operating state of the computing device 10 prior to the introduction of the introduced process 20. The nominal value may comprise a mean value of the processing overhead of the system agent 18 for the given operating state of the computing device 10. This may enable the system agent 18 response to the introduced process 20 to be monitored, and where the processing overhead of the system agent 18 increases in response to the introduced process 20, a signal may be output. The signal may comprise a signal indicative of increased processing overhead of the system agent 18, which may, for example, be indicative of a change in an operating state of the computing device 10. Thus a user or a system engineer may be notified that the system agent 18 and/or the computing device 10 has changed operational state in response to the introduced process 20.

An increase in processing overhead of the system agent 18 in response to the introduced process 20 may be indicative that an operating state of the system agent 18 and/or an operating state of the computing device 10 has changed relative to the operating state for which the pre-determined (or nominal/mean) processing overhead was calculated.

This may, for example, be indicative of an update to the system agent 18 and/or computing device 10 relative to the version of the system agent 18 and/or computing device 10 for which the pre-determined (or nominal/mean) processing overhead was calculated. An increase in processing overhead may be deemed unacceptable to user experience, and hence, responsive to a signal indicative of increased processing overhead, the system agent 18 and/or the computing device 10 may be "downgraded" to a previous version of the system agent 18 and/or the computing device 10, or otherwise altered.

Additionally or alternatively, this may, for example, be indicative that the system agent 18 is interacting with the introduced process 20 in a non-optimal manner. For example, this may be indicative that the system agent 18 is interacting with the introduced process 20 when it does not really need to.

Figure 3:
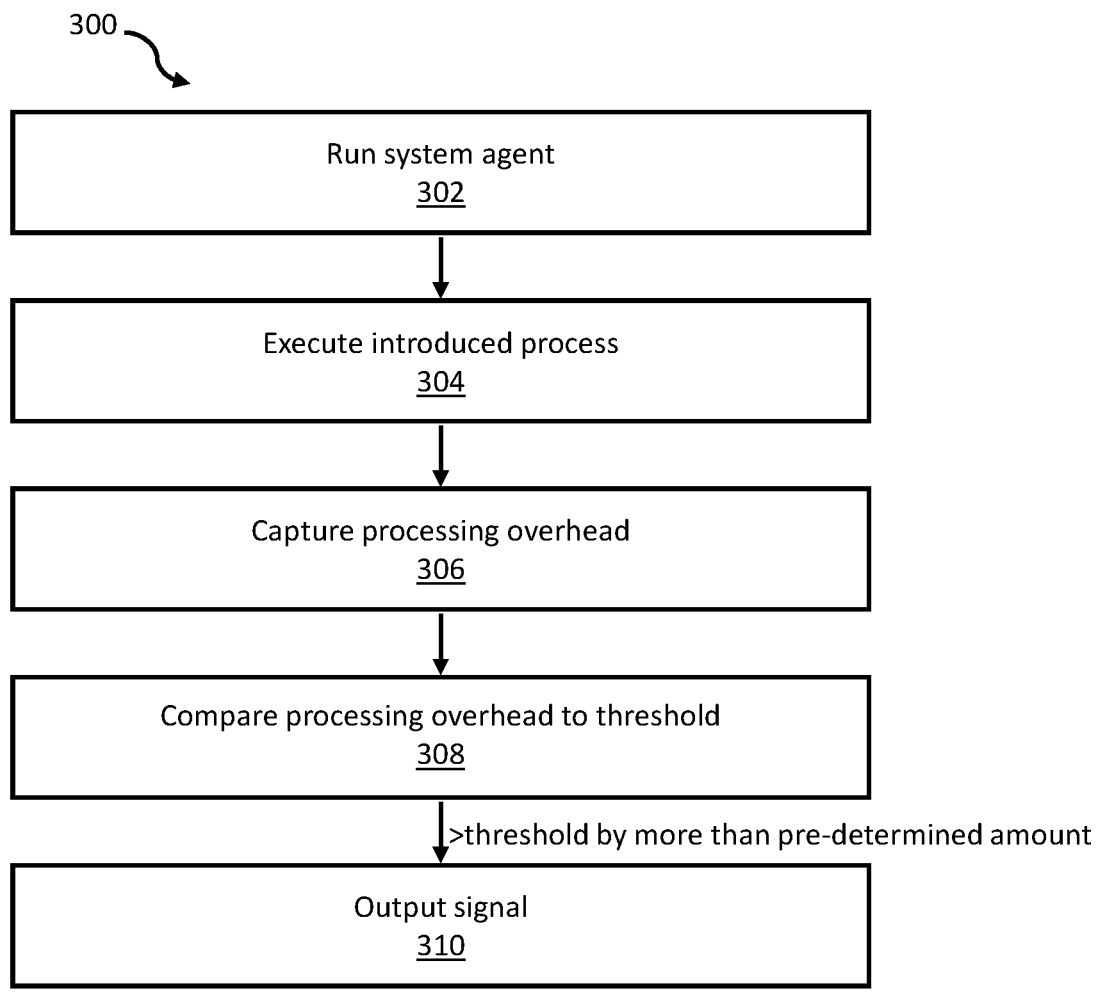
FIG. 3 is a schematic view illustrating a second method of monitoring an operating state of a computing device according to an example.

A method 300 in which the captured parameter comprises processing overhead of a system agent is shown schematically in FIG. 3. The method 300 comprises running 302 a system agent on a computing device, and executing 304 an introduced process on the computing device. Processing overhead of the system agent is captured 306 during and after the execution of the introduced process, and the captured processing overhead is compared 308 to a nominal value of the processing overhead for the operating state of the computing device pre-execution of the introduced process. Where the captured processing overhead differs from the nominal processing overhead by more than a pre-determined threshold, a signal is output 310, with the signal being indicative of an increase in the processing overhead of the system agent, and hence indicative of a change in operating state of the computing device.

In some examples, the captured parameter may comprise a time taken to execute the introduced process 20, and the pre-determined parameter may comprise a nominal time taken to execute the introduced process 20 for a given operating state of the computing device 10. For example, the pre-determined parameter may comprise a nominal value for the time taken to execute the introduced process 20 for the known operating state of the computing device 10 prior to the introduction of the introduced process 20. The nominal value may comprise a mean value of the time taken to execute the introduced process 20 for the given operating state of the computing device 10. This may enable the computing device 10 response to the introduced process 20 to be monitored, and where the time taken to execute the introduced process 20 increases, a signal may be output. The signal may comprise a signal indicative of increased time taken to execute the introduced process 20, which may, for example, be indicative of a change in an operating state of the computing device 10. Thus a user or a system engineer may be notified that the computing device 10 has changed operational state in response to the introduced process 20, or for example, that the computing device 10 has changed operational state relative to the operating state for which the pre-determined parameter has been calculated.

An increase in time taken to execute the introduced process 20 may be indicative that an operating state of the system agent 18 and/or an operating state of the computing device 10 has changed relative to the operating state for which the pre-determined (or nominal/mean) time taken to execute the introduced process 20 was calculated. This may, for example, be indicative of an update to the system agent 18 and/or computing device 10 relative to the version of the system agent 18 and/or computing device 10 for which the pre-determined (or nominal/mean) time taken to execute the introduced process 20 was calculated. An increase in time taken to execute the introduced process 20 may be deemed indicative of an unacceptable detriment to user experience, and hence, responsive to a signal indicative of increased time taken to execute the introduced process 20, the system agent 18 and/or the computing device 10 may be "downgraded" to a previous version of the system agent 18 and/or the computing device 10, or otherwise altered.

Figure 4:
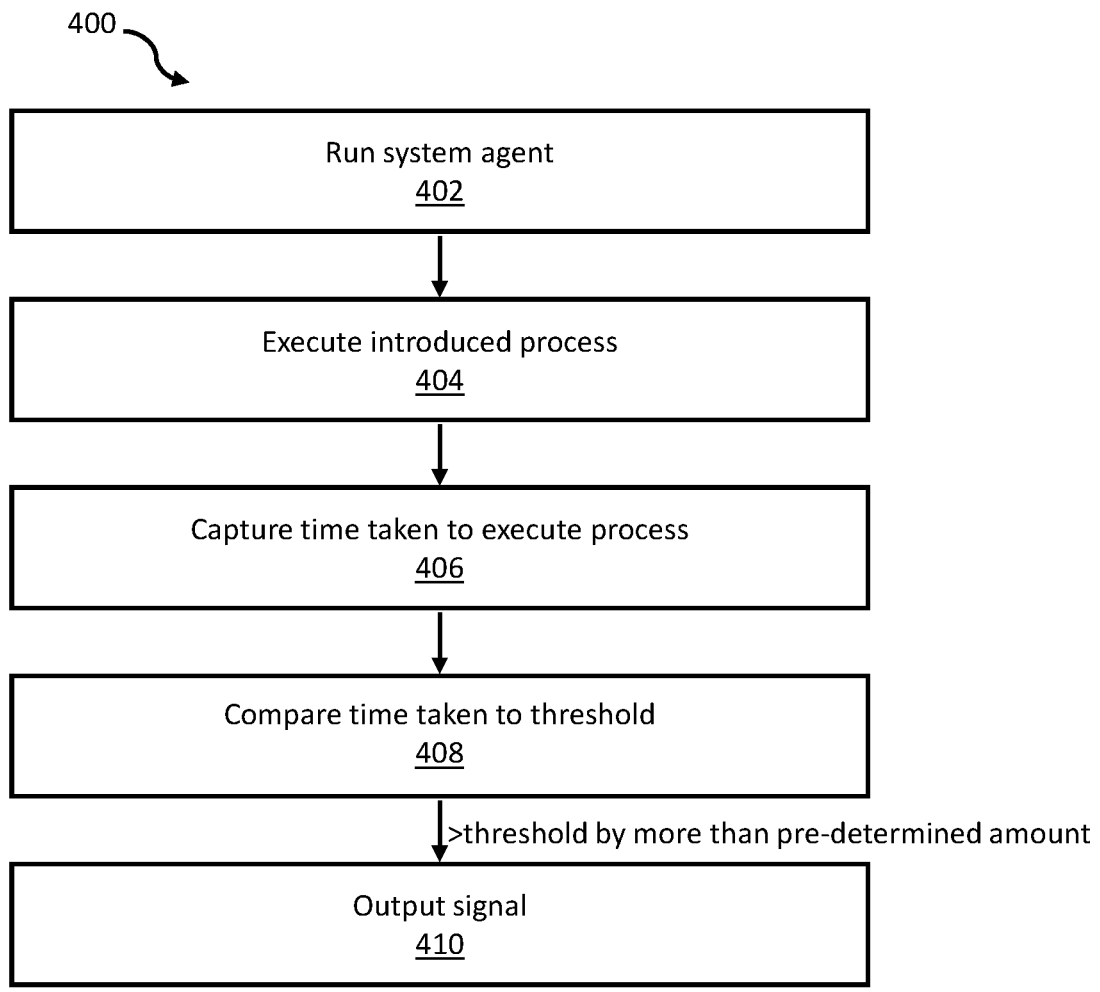
FIG. 4 is a schematic view illustrating a third method of monitoring an operating state of a computing device according to an example.

A method 400 in which the captured parameter comprises a time taken to execute an introduced process is shown schematically in FIG. 4. The method 400 comprises running 402 a system agent on a computing device, and executing 404 an introduced process on the computing device. A time taken to execute the process is captured 406, and the captured time taken is compared 408 to a nominal value of the time taken for the operating state of the computing device pre-execution of the introduced process. Where the captured time taken differs from the nominal time taken by more than a pre-determined threshold, a signal is output 410, with the signal being indicative of an increase in the time taken to execute the introduced process, and hence indicative of a change in operating state of the computing device.

In some examples, the introduced process 20 may comprise a low-level process, for example a process which requires very little processing power and/or memory requirements. A low-level process may comprise a process typically undertaken during operation of the computing device 10. The introduced process 20 may comprise a nominal execution time value of milliseconds. Thus the introduced process 20 may have relatively little impact on user experience during normal execution.

The introduced process 20 may comprise reading and/or writing to memory. For example, the introduced process 20 may comprise reading and/or writing to memory a plurality of times. The introduced process 20 may comprise reading from memory sequentially or at random. The introduced process 20 may comprise reading reverse sequentially from memory. This may minimise negative interaction with operating system caching, for example. In some examples, the introduced process 20 may comprise reading 100,000 blocks reverse sequentially from memory. In some examples, the introduced process 20 may comprise reading 100,000 blocks randomly from memory. Where the introduced process 20 comprises writing to memory, the introduced process 20 may comprise subsequently deleting what has been written in memory.

In some examples, the introduced process 20 may comprise reading and/or writing a registry key. For example, the introduced process 20 may comprise reading and/or writing a registry key a plurality of times. Where the introduced process 20 comprises writing a registry key, the introduced process 20 may comprise subsequently deleting the written registry key. The introduced process 20 may comprise reading a registry key 2,000,000 times. In some examples, the introduced process 20 may comprise writing and deleting a registry key 1,000,000 times.

The introduced process 20 may comprise creating and/or deleting a file, for example an empty file. The introduced process 20 may comprise creating and/or deleting a file a plurality of times. The introduced process may comprise creating an empty file 100,000 times.

In some examples, the introduced process 20 may comprise creating and/or deleting a hidden window, for example creating and/or deleting a hidden window a plurality of times. The introduced process may comprise creating a hidden window 1,000 times.

The introduced process 20 may comprise allocating and/or zeroing a block of memory, for example allocating and/or zeroing a block of memory a plurality of times. The introduced process 20 may comprise allocating and zeroing a block of memory 200,000 times.

In some examples, the introduced process 20 may comprise opening and/or closing an event handle, for example opening and/or closing an event handle a plurality of times. In some examples, the introduced process 20 may comprise opening and closing an event handle 2,000,000 times.

The introduced process 20 may comprise loading and/or unloading a dynamic link library, DLL, for example loading and/or unloading a DLL a plurality of times. The introduced process may comprise loading and unloading a DLL 10,000 times.

In some examples, the introduced process 20 may comprise running an empty process executable, for example running an empty process executable a plurality of times. The introduced process 20 may comprise running an empty process executable 500 times.

The introduced process 20 may comprise launching the computing device and/or a process on the computing device.

In some examples, the introduced process 20 may comprise sending a UDP datagram to a port, for example sending a UDP datagram to a port a plurality of times. The introduced process 20 may comprise sending a UDP datagram to a port 1,000,000 times.

The introduced process 20 may comprise posting a message to a window and receiving the posted message in a window message queue, for example posting a message to a window and receiving the posted message in a window message queue a plurality of times.

In some examples, the introduced process 20 may comprise creating a thread and/or signalling an event object held by a creating thread, for example creating a thread and signalling an event object held by the creating thread a plurality of time.

The introduced process 20 may comprise measuring an interval between successive timeslices allocated to a process and summing the total time taken for the process.

In some examples, the pre-determined parameter may comprise a nominal value of a corresponding parameter of the introduced process 20 or the system agent 18 for a given operating state of the computing device 10 and/or the system agent 18. For example, the pre-determined parameter may comprise a nominal value of a corresponding parameter of the introduced process 20 or the system agent 18 for a known operating state of the computing device 10 prior to the introduction of the introduced process 20. The pre-determined parameter may comprise a mean value of a corresponding parameter of the introduced process 20 or the system agent 18 for a given operating state of the computing device 10 and/or the system agent 18. For example, a captured parameter may be compared to a mean value parameter.

The method may comprise updating the pre-determined parameter based on captured parameters from at least one previous execution of the introduced process 20. This may provide a more accurate reflection of the nominal or mean value of the parameter corresponding to the captured parameter, which may take into account real-world operating characteristics.

The pre-determined threshold may comprise a value related to the pre-determined parameter, for example any or any combination of a fixed percentage of the pre-determined parameter and the standard deviation of the pre-determined parameter. Where the pre-determined parameter comprises a mean value of a corresponding parameter of the introduced process 20 or the system agent 18 for a known operating state of the computing device 10, the pre-determined threshold may comprise a standard deviation of the corresponding parameter.

Where the captured parameter comprises the time taken to execute the introduced process 20, the pre-determined parameter may comprise a mean value of the time taken to execute the introduced process 20 for a given operating state of the computing device 10, and the pre-determined threshold may comprise a standard deviation corresponding to the mean value. Thus, where the captured time taken to execute the introduced process 20 exceeds the mean value by more than the standard deviation, a signal indicative of a change in operating state of the computing device 10 may be output.

Where the captured parameter comprises processing overhead of the system agent 18 during and/or after execution of the introduced process 20, the pre-determined parameter may comprise a mean value of processing overhead of the system agent 18 during and/or after execution of the introduced process 20 for a given operating state of the computing device 10, and the pre-determined threshold may comprise a standard deviation corresponding to the mean value. Thus where the captured processing overhead exceeds the mean value by more than the standard deviation, a signal indicative of a change in operating state of the computing device 10 may be output.

In some examples, the method may comprise periodically executing the introduced process 20 on the computing device 10, capturing the captured parameter for each execution, and comparing the captured parameter to the pre-determined parameter for each execution. This may build-up a history of captured parameters, and may enable calculation of mean values of the captured parameters and/or updating of the pre-determined parameter/pre-determined threshold as previously discussed.

In some examples, the method may comprise updating one of the computing device 10 and the system agent 18 in a time period between executions of the introduced process. This may enable a response of the computing device 10, for example in terms of time taken to execute the introduced process 20 and/or processing overhead of the system agent 18, to an update of the computing device 10 or the system agent 18 to be monitored and for appropriate action to be taken.

Where a system agent 18 or the operating system of a computing device 10 is updated, detrimental effects may sometimes be experienced, particularly with regard to user experience. By executing the introduced process 20 both before and after an upgrade, changes in the captured parameter may be identified, and appropriate action may be taken. For example, an update may be rolled-back, or an alternative or additional upgrade may be applied.

Figure 5:
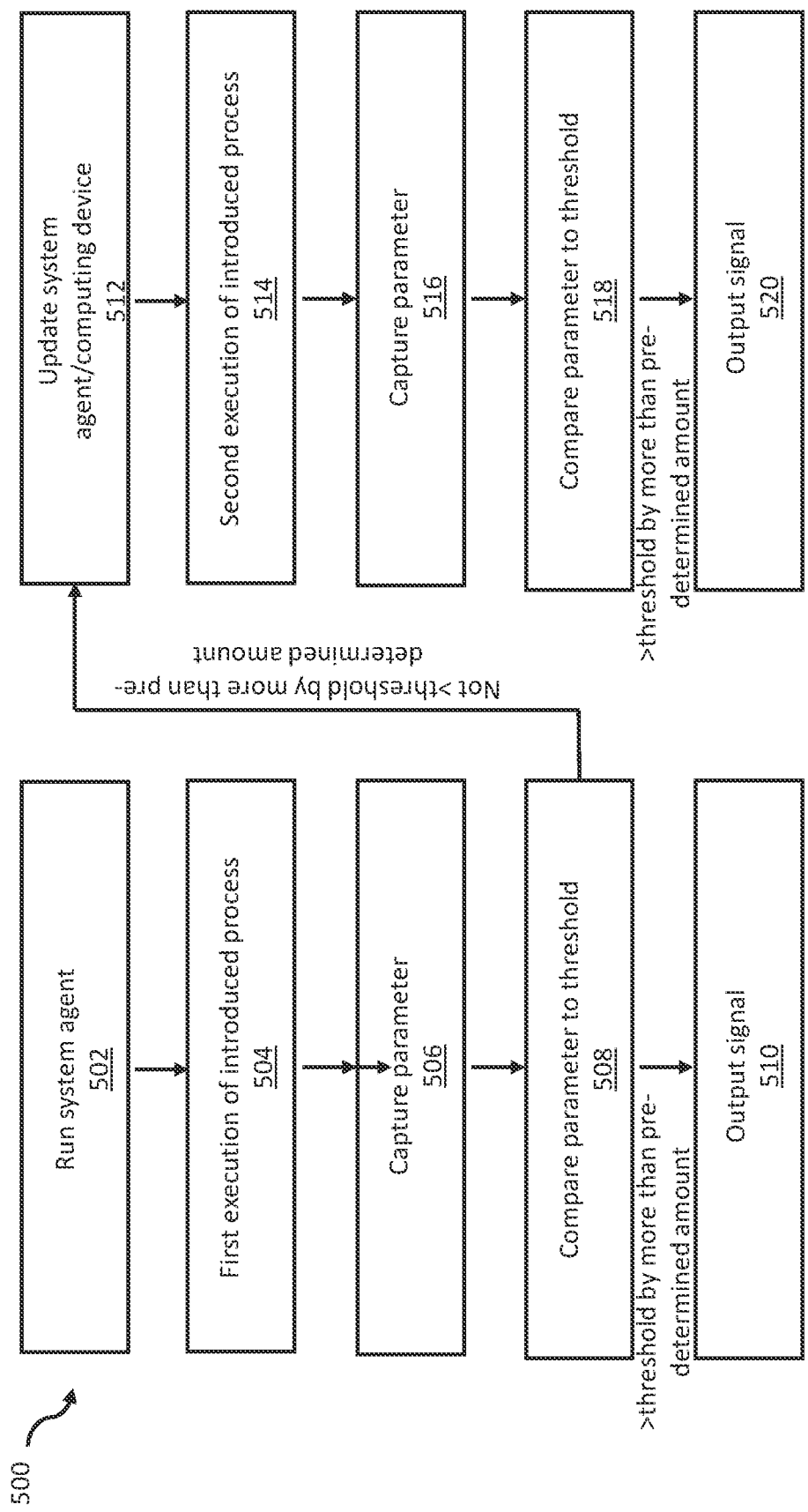
FIG. 5 is a schematic view illustrating a fourth method of monitoring an operating state of a computing device according to an example.

A method 500 in which an upgrade is performed between executions of the introduced program 20 is shown schematically in FIG. 5. The method 500 comprises running 502 the system agent 18 on the computing device 10, and performing a first execution 504 of the introduced process 20 on the computing device 10. A captured parameter is captured 506, with the captured parameter relating to at least one of the system agent 18 and the introduced process 20. The captured parameter is compared 508 to a pre-determined parameter and where the captured parameter differs from the pre-determined parameter by more than a pre-determined threshold, a signal is output 510, with the signal being indicative of a change in operating state of the computing device 10. Where no signal is output, an update is performed 512 on at least one of the system agent 18 and the computing device 10. A second execution of the introduced process 20 is performed 514 on the computing device. A captured parameter is captured 516, with the captured parameter relating to at least one of the system agent 18 and the introduced process 20. The captured parameter is compared 518 to a pre-determined parameter and where the captured parameter differs from the pre-determined parameter by more than a pre-determined threshold, a signal is output 510, with the signal being indicative of a change in operating state of the computing device 10.

In this way, a response of the computing device to an upgrade of the system agent 18 or the computing device 10 operating system may be monitored, and appropriate action may be taken, for example to modify the system agent 18 or computing device operating system.

In some examples, the method may comprise executing a plurality of introduced processes on the computing device, capturing at least one captured parameter relating to each introduced process, comparing the captured parameters to corresponding pre-determined parameters, and where the captured parameter differs from the pre-determined parameter by more than a pre-determined threshold for at least one of the captured parameters, outputting the signal indicative of a change in the operating state of the computing device. This may allow for computing device responses to be monitored for a number of different introduced processes, and may, for example, allow for enhanced diagnosis linking the change in operating state to one or more of the introduced processes. The plurality of introduced processes may be executed simultaneous or sequentially, for example at the same time or in a pre-determined sequence. A sequential execution of introduced processes may take longer to execute, yet may allow for easier linking of an introduced process to an identification of a change in operating state.

An example where a plurality of introduced processes are executed is shown in Table 1 below.

TABLE 1

| Introduced Process | Captured Time to Execute (s) | Mean Time to Execute (s) | Standard Deviation (s) | Compliance |
| --- | --- | --- | --- | --- |
| DiskSeq | 14.92 | 13.9 | 4.3 | 1 |
| DiskRand | 9.81 | 13.9 | 4.2 | 1 |
| LoadDLL | 5.90 | 3.9 | 1.1 | 0 |
| CreateFIle | 9.66 | 21.8 | 8.7 | 1 |
| OpenHandle | 9.46 | 8.9 | 1.9 | 1 |
| Memory | 8.11 | 6.6 | 1.7 | 1 |
| RegReadHKLM | 13.01 | 9.1 | 1.9 | 0 |
| RegWriteHKCU | 9.70 | 20.9 | 5.1 | 1 |
| RegWriteHKLM | 7.93 | 14.4 | 4.2 | 1 |
| UDPSend | 10.76 | 7.3 | 2.7 | 0 |
| CreateProcess | 7.23 | 17.2 | 5.2 | 1 |
| Create Window | 13.65 | 5.8 | 3.5 | 0 |

In the example of Table 1, the captured parameter is the time taken to execute the introduced process, the pre-determined parameter is the mean time taken to execute the introduced process, and the pre-determined threshold is the standard deviation related to the mean.

DiskSeq is a process where 100,000 blocks are read reverse sequentially from memory.

DiskRand is a process where 100,000 blocks are read randomly from memory

LoadDLL is a process where a DLL is loaded and unloaded 10,000 times.

CreateFile is a process where an empty file is created 100,000 times.

OpenHandle is a process where an event handle is opened and closed 2,000,000 times.

Memory is a process where a 1M block of memory is allocated and zeroed 200,000 times.

RegReadHKLM is a process where a registry key is read 2,000,000 times.

RegWriteHKCU is a process where a registry key is written and deleted 1,000,000 times.

RegWriteHKLM is a process where a registry key is written and deleted 1,000,000 times.

UDPSend is a process where a UDP datagram is sent to a port 1,000,000 times.

CreateProcess is a process where the time taken for an application to start-up is measured.

Create Window is a process where a hidden window is created 1,000 times.

From Table 1, the captured time taken to execute each process is compared to the corresponding mean and standard deviation, with the compliance value being determined based on the comparison output. Where the captured time exceeds the mean plus standard deviation, a compliance value of 0 is returned. This indicates that the process has taken too long to execute, and may be indicative of a change in operating state of the computing device. Where the captured time does not exceed the mean plus standard deviation, a compliance value of 1 is returned.

In an example, the method may comprise running a first system agent on the computing device 10 during a first execution of the introduced process 20, and running the first system agent and a second system agent on the computing device 10 during a second execution of the introduced process 20. In such a way it may be possible to tell if the second system agent present during the second execution of the introduced process causes a change in operating state of the computing device 10. This may allow for modifications to be made to the second system agent if it is identified to be the cause of a change in operating state of the computing device 10.

Figure 6:
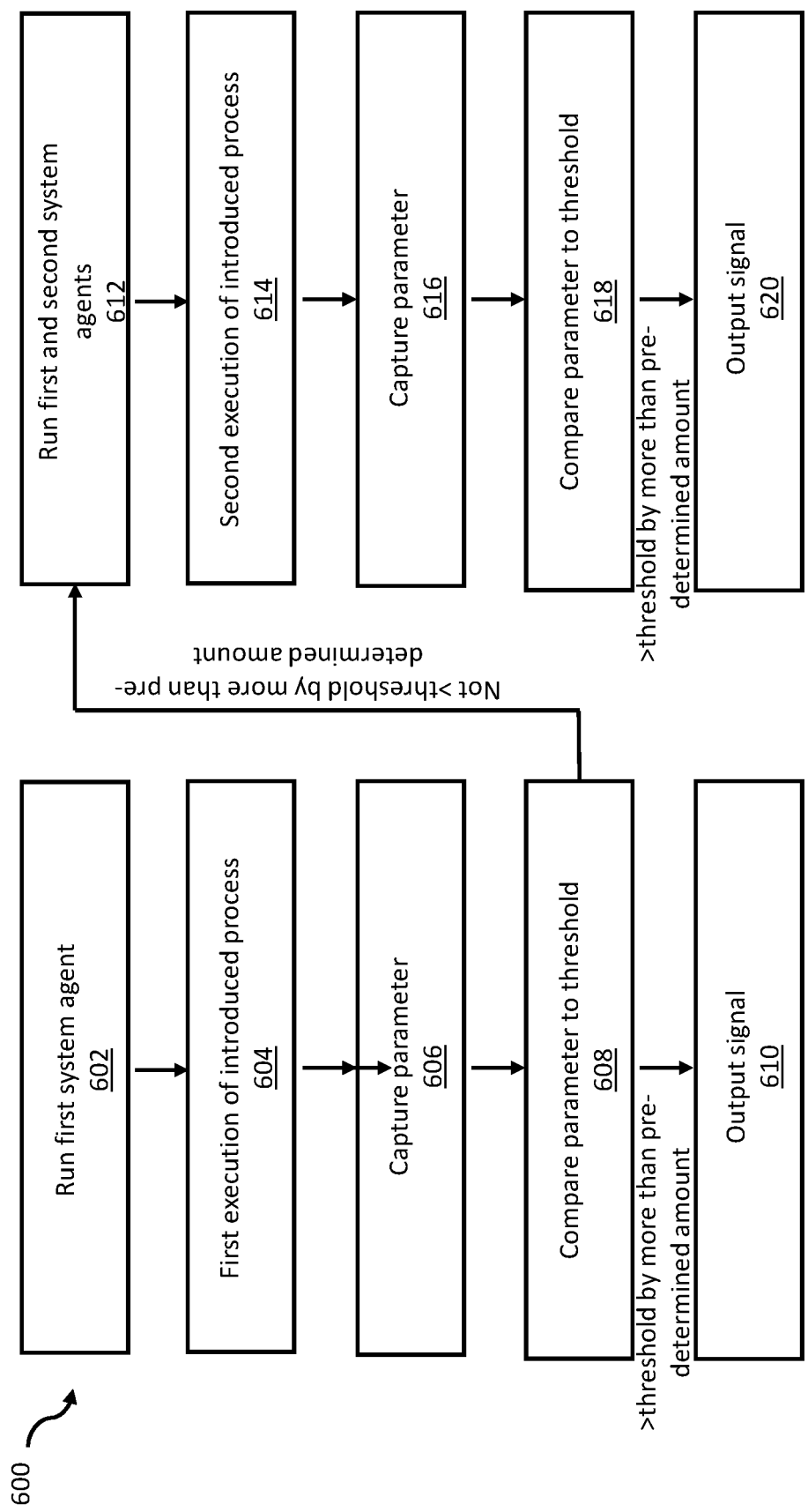
FIG. 6 is a schematic view illustrating a fifth method of monitoring an operating state of a computing device according to an example.

A method 600 in which a first system agent is run during a first execution of an introduced process, and in which the first system agent and a second system agent are run during a second execution of the introduced process, can be seen schematically in FIG. 6. The method 600 comprises running 602 a first system agent on a computing device, and performing a first execution 604 of an introduced process on the computing device. A captured parameter is captured 606, with the captured parameter relating to at least one of the first system agent and the introduced process. The captured parameter is compared 608 to a pre-determined parameter and where the captured parameter differs from the pre-determined parameter by more than a pre-determined threshold, a signal is output 610, with the signal being indicative of a change in operating state of the computing device. Where no signal is output, the first system agent and a second system agent are run 612 on the computing device. A second execution of the introduced process is performed 614 on the computing device. A captured parameter is captured 616, with the captured parameter relating to at least one of the system agents and the introduced process. The captured parameter is compared 618 to a pre-determined parameter and where the captured parameter differs from the pre-determined parameter by more than a pre-determined threshold, a signal is output 620, with the signal being indicative of a change in operating state of the computing device.

Such a method 600 may identify if the second system agent present during the second execution of the introduced process causes a change in operating state of the computing device.

In some examples, the method may comprise capturing a first captured parameter relating to the system agent and a second captured parameter relating to the introduced process, comparing the first captured parameter to a first pre-determined parameter, comparing the second captured parameter to the second pre-determined parameter, and where the first captured parameter differs from the first pre-determined parameter by more than a first pre-determined threshold and/or the second captured parameter differs from the second pre-determined parameter by more than a second pre-determined threshold outputting the signal indicative of a change in the operating state of the computing device. This may enable easier identification of issues which cause changes in the operating state of the computing device.

For example, where it is determined that the first captured parameter differs from the first pre-determined parameter by more than the first pre-determined threshold, but the second captured parameter does not differ from the second pre-determined parameter by more than a second pre-determined threshold, this may be indicative of a change linked to the system agent.

In some examples the first parameter may comprise processing overhead of the system agent, and the second parameter may comprise a time taken to execute the introduced process.

Figure 7:
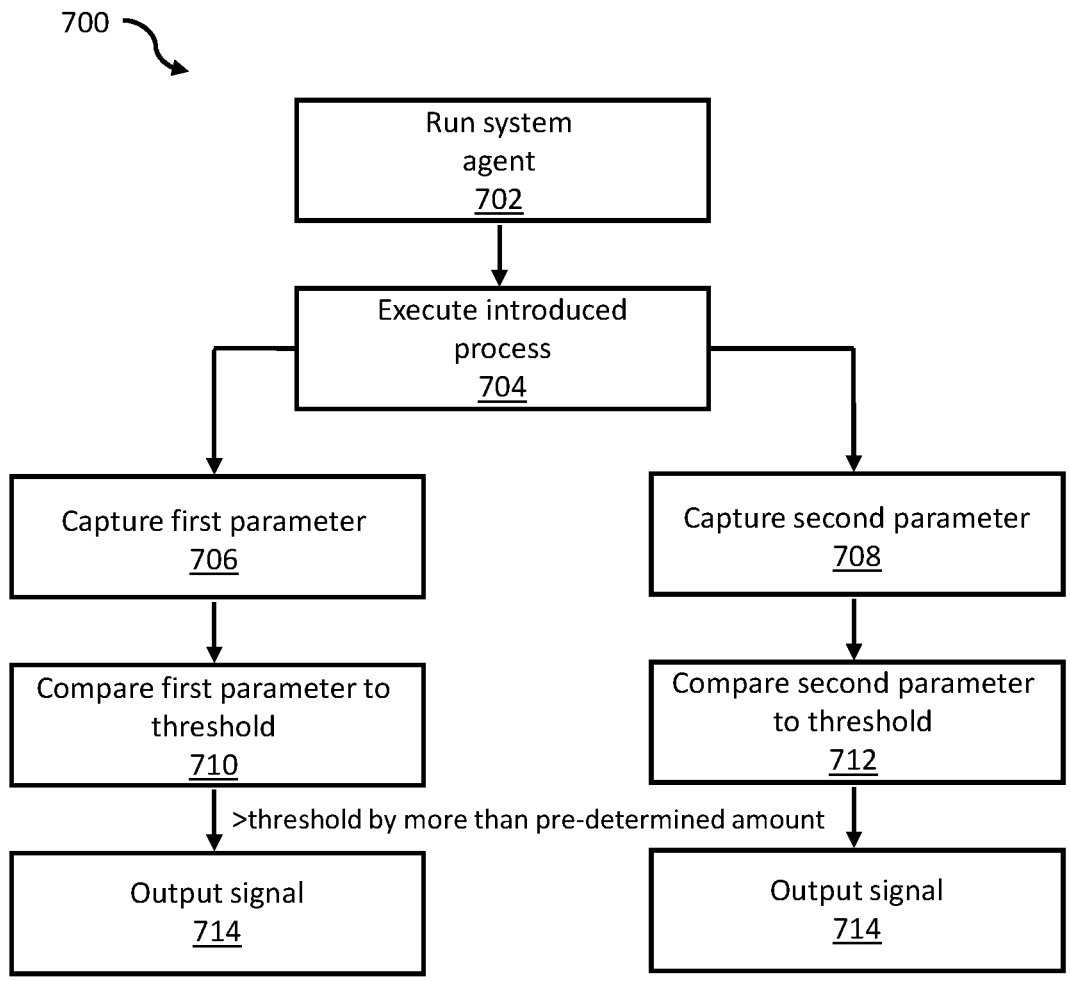
FIG. 7 is a schematic view illustrating a sixth method of monitoring an operating state of a computing device according to an example.

A method 700 in which a first captured parameter relates to a system agent and a second captured parameter relates to an introduced process is shown schematically in FIG. 7.

The method 700 comprises running 702 a system agent on a computing device 10, and executing 704 an introduced process on the computing device. A first captured parameter relating to the system agent is captured 706, and a second captured parameter relating to the introduced process is captured 708. The first captured parameter is compared 710 to a first pre-determined parameter, and the second captured parameter is compared 712 to a second pre-determined parameter. Where the first captured parameter differs from the first pre-determined parameter by more than a first pre-determined threshold and/or where the second captured parameter differs from the second pre-determined parameter by more than a second pre-determined threshold, a signal is output 714, with the signal being indicative of a change in operating state of the computing device.

In an example, the method may comprise generating a report indicative of an operating state of the computing device and/or an operating state of the system agent in response to the signal. The report may be displayed on a display of the computing device, or may be displayed at a location remote from the computing device, for example via communication with a network linked server. The report may comprise a graph indicative of a plurality of captured parameters related to a plurality of introduced process and/or may comprise a graph indicative of a plurality of captured parameters related to a plurality of system agents.

In an example, the method may comprise modifying an operating state of the computing device 10 and/or modifying an operating state of the system agent 18 in response to the signal. For example, an operating system of the computing device may be modified in response to the signal. An operating system of the computing device may be upgraded or downgraded in response to the signal. The system agent may be upgraded or downgraded in response to the signal. The method may comprise reverting to a previous operating state of the computing device and/or a previous operating state of the system agent in response to the signal.

In some examples, the system agent may comprise an anti-virus agent. Where an operating state of an anti-virus agent changes in response to an introduced process, it may be indicative that an anti-virus agent is interacting with the introduced process. This may cause a perceived drop in performance, and may have a detrimental effect on user experience. By executing the introduced process and monitoring an anti-virus agent response, it may be possible to identify that the anti-virus agent is having a negative impact on the computing device 10, and thus action can be taken. For example, the introduced process may be added to a "whitelist" for the anti-virus agent, which may mean that the anti-virus agent does not need to interact with the introduced process. The removal of this interaction may result in improved user experience, as, for example, the computing device may be more responsive and/or run at a greater speed.

Figure 8:
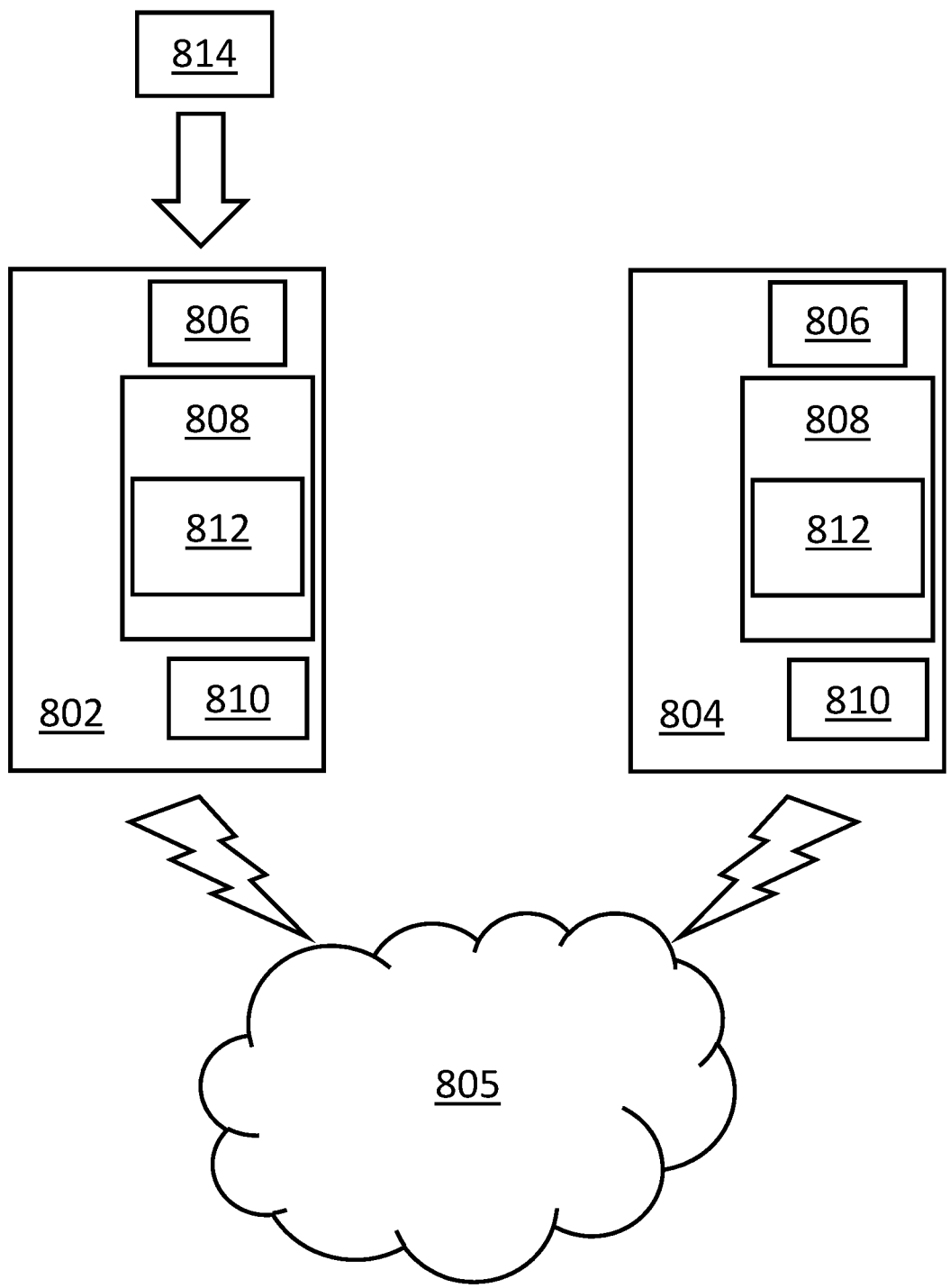
FIG. 8 is a schematic view illustrating a system of computing devices according to an example.

A system 800 in accordance with an example of the present disclosure is shown schematically in FIG. 8.

The system 800 comprises first 802 and second 804 computing devices, with the first 802 and second 804 computing devices each coupled to a network 805. The first 802 and second 804 computing devices may comprise devices of the same type, for example both laptop computers, or in some examples may comprise devices of a different type, for example one being a laptop and the other being a cell phone. The coupling to the network 805 may be remote coupling, for example via WiFi, or may be a hard coupling, for example via one or more network cables.

In the example of FIG. 8, the computing devices 802,804 are schematically shown as having a similar structure for the sake of clarity. Here, each computing device 802,804 comprises a processor 806, a memory 808, a display 810, and an installed system agent 812 stored in the memory 808. The processors 806 of the first computing device 802 is configured to execute an introduced process 814 on the first computing device 802, to capture a captured parameter relating to at least one of the system agent 812 and the introduced process 814, to compare the captured parameter to a pre-determined threshold, and where the captured parameter differs from the pre-determined parameter by more than a pre-determined threshold, to output a signal indicative of a change in operating state of the first computing device 802. In response to the signal, an operating state of the second computing device 804 and/or an operating state of the system agent 812 running on the second computing device 804 is modified.

In such a manner, the introduced process 814 on the first computing device 802 may provide an indication that the operating state of the first computing device 802 has been changed in a negative manner, and action can be taken to pre-emptively resolve the same issue for the second computing device 804. The system may comprise any number of computing devices, with the modification being made to each computing device in response to the signal.

The first 802 and second 804 computing devices may be in substantially the same operating state prior to execution of the introduced process. The first 802 and second 804 computing device may comprise the same system agent 812. The signal may be transmitted over the network 805.

Figure 9:
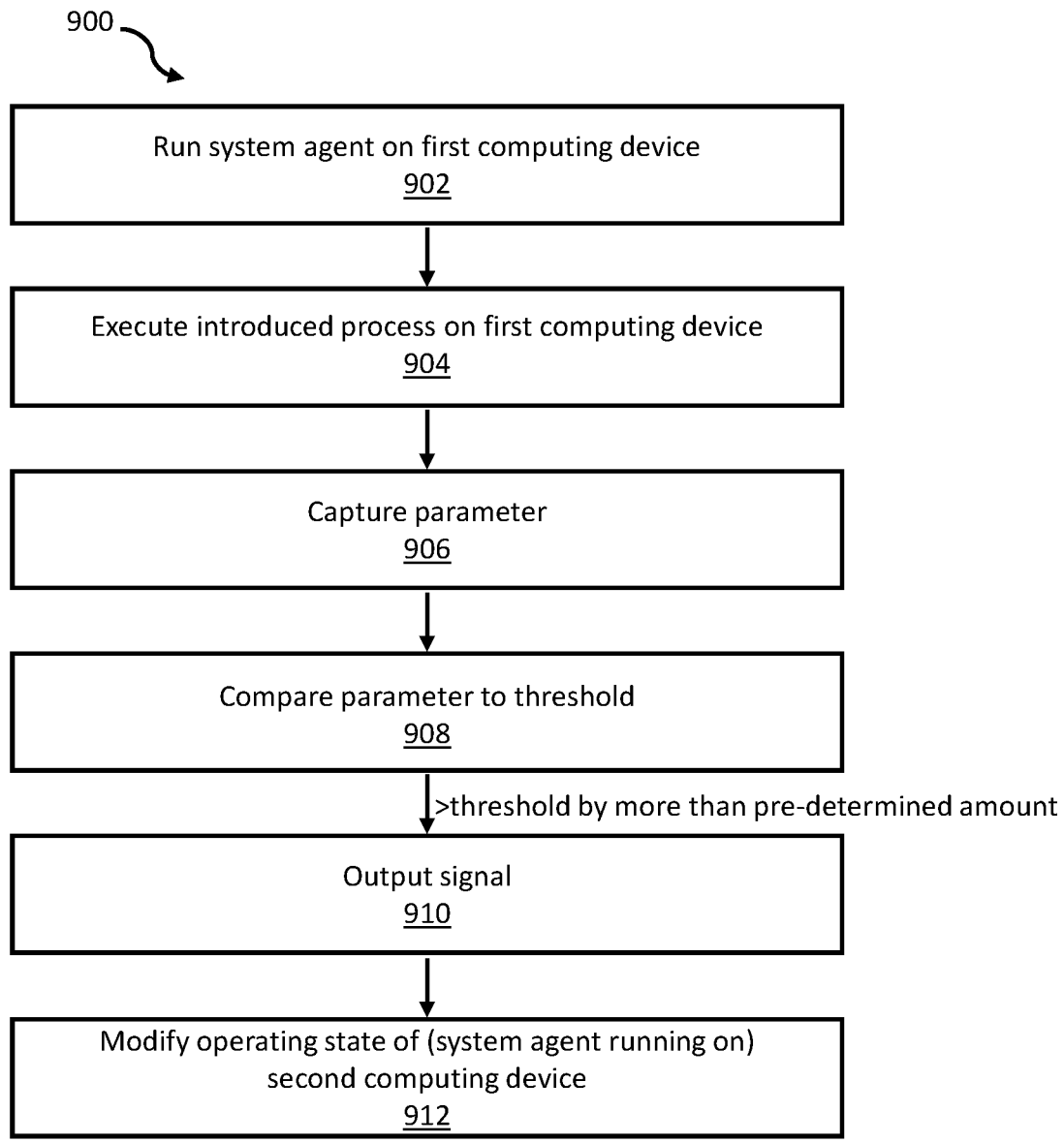
FIG. 9 is a schematic view illustrating a method of controlling a system of computing devices according to an example.

A method 900 of operating the system 800 of FIG. 8 is shown schematically in FIG. 9. The method 900 comprises running 902 the system agent 812 on the first computing device 802 and executing 904 the introduced process 814 on the first computing device 802. A captured parameter relating to at least one of the system agent 812 and the introduced process 814 is captured 906, and the captured parameter is compared 908 to a pre-determined parameter. Where the captured parameter differs from the pre-determined parameter by more than a pre-determined threshold a signal is output 910, with the signal being indicative of a change in operating state of the first computing device 802. In response to the signal, an operating state of the second computing device 804 and/or an operating state of a system agent running on the second computing device 804 is modified 912.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of monitoring an operating state of a computing device, the method comprising:
    running a system agent on the computing device;
    executing a low-level process on the computing device;
    capturing a time taken to execute the low-level process, wherein the time taken to execute the low-level process is indicative of an impact on the system agent and/or the low-level process caused by interaction between the system agent and the low-level process;
    comparing the captured time to a pre-determined time; and
    where the captured time differs from the pre-determined time by more than a pre-determined threshold, outputting a signal indicative of a change in operating state of the computing device.

2. A method as claimed in claim 1, wherein the signal indicative of a change in the operating state of the computing device is output where the captured time is greater than the pre-determined time by more than the pre-determined threshold.

3. A method as claimed in claim 1, wherein the method comprises periodically executing the low-level process on the computing device, capturing the time taken to execute the low-level process for each execution, and comparing the captured time to the pre-determined time for each execution.

4. A method as claimed in claim 3, wherein the method comprises updating one of the computing device and the system agent in a time period between executions of the low-level process.

5. A method as claimed in claim 1, wherein the pre-determined time comprises a nominal time taken to execute the low-level process for a given operating state of the computing device.

6. A method as claimed in claim 1, wherein the signal indicative of a change in the operating state of the computing device is a signal indicative of an increased time taken to execute the low-level process.

7. A method as claimed in claim 1, wherein the method comprises executing a plurality of low-level processes on the computing device, capturing a time taken to execute each low-level process, comparing the captured times to corresponding pre-determined times, and where the captured time differs from the pre-determined time by more than a pre-determined threshold for at least one of the captured times, outputting the signal indicative of a change in the operating state of the computing device.

8. A method as claimed in claim 7, wherein the plurality of low-level processes are introduced simultaneously.

9. A method as claimed in claim 7, wherein the plurality of low-level processes are introduced in a pre-determined sequence, with a time period between each low-level process.

10. A method as claimed in claim 1, wherein the low-level process comprises any or any combination of reading or writing to a disk, reading or writing to a registry, creating an empty file, creating a hidden window, allocating or clearing a block of memory, opening and closing an event handler, loading or unloading a dynamic linked library, sending a UDP datagram to a port, starting a process, starting computing device boot processes, posting or receiving a message to or from a window, creating a thread and signalling an event object held by the thread, and measuring an interval between successive timeslices allocated to a process.

11. A method as claimed in claim 1, wherein the pre-determined time comprises a mean value of a nominal corresponding time of the low-level process for a given operating state of the computing device and/or system agent.

12. A method as claimed in claim 1, wherein the pre-determined threshold comprises any or any combination of a pre-defined percentage or the standard deviation of the pre-determined time.

13. A method as claimed in claim 1, wherein the method comprises updating the pre-determined time based on a captured time from at least one previous execution of the low-level process.

14. A method as claimed in claim 1, wherein the method comprises modifying an operating state of the computing device and/or an operating state of the system agent in response to the signal.

15. A method as claimed in claim 1, wherein the method comprises reverting to a previous operating state of the computing device and/or a previous operating state of the system agent in response to the signal.

16. A method of operating a system comprising first and second computing devices, the method comprising:
   running a system agent on the first computing device;
   executing a low-level process on the first computing device;
   capturing a time taken to execute the low-level process, wherein the time taken to execute the low-level process is indicative of an impact on the system agent and/or the low-level process caused by interaction between the system agent and the low-level process;
   comparing the captured time to a-pre-determined time; and
   where the captured time differs from the pre-determined time by more than a pre-determined threshold, outputting a signal indicative of a change in an operating state of the first computing device; and
   in response to the signal, modifying an operating state of the second computing device and/or modifying an operating state of a system agent running on the second computing device.

* * * * *